(12) United States Patent
Gasbarro

(10) Patent No.: US 6,607,091 B2
(45) Date of Patent: Aug. 19, 2003

(54) STEAM TABLE PAN

(75) Inventor: Robert Gasbarro, Northridge, CA (US)

(73) Assignee: Catalina China, Inc., Tucson, AZ (US)

( * ) Notice: Subject to any disclaimer, the term of this patent is extended or adjusted under 35 U.S.C. 154(b) by 37 days.

(21) Appl. No.: 09/932,698

(22) Filed: Aug. 17, 2001

(65) Prior Publication Data

US 2003/0034348 A1 Feb. 20, 2003

(51) Int. Cl.[7] .............................................. A47J 27/00
(52) U.S. Cl. .................................. 220/573.1; 220/23.4
(58) Field of Search ........................ 220/23.4, 573.1, 220/573.4, 574, 575

(56) References Cited

U.S. PATENT DOCUMENTS

| | | | | |
|---|---|---|---|---|
| 863,536 A | * | 8/1907 | Hudson | 220/23.4 |
| 1,628,641 A | * | 5/1927 | Bolton | 220/23.4 |
| 1,976,622 A | * | 10/1934 | McIntyre | 220/23.4 |
| 2,357,399 A | * | 9/1944 | Gregory | |
| 2,575,294 A | * | 11/1951 | Putorak | 220/23.4 |
| 2,583,822 A | * | 1/1952 | Duncan | 220/23.4 |
| 2,599,853 A | * | 6/1952 | McClain et al. | 220/23.4 |
| 3,908,828 A | * | 9/1975 | Lohwasser | 206/504 |
| 5,433,314 A | * | 7/1995 | Lin | 206/5.1 |
| 5,447,249 A | * | 9/1995 | Vickers | 220/23.83 |

* cited by examiner

Primary Examiner—Joseph M. Moy
(74) Attorney, Agent, or Firm—William B. Ritchie

(57) ABSTRACT

A steam table pan made of ceramic is disclosed. The pan is generally rectangular, having a lower flange along one length of the rectangle, and an upper flange along the opposite length. When two such pans are placed side by side, the lower flange of the first pan fits snuggly in an interlocking position with the upper flange of the second pan. In this manner several such ceramic pans may be positioned side by side on a steam table or a similar serving bar.

7 Claims, 3 Drawing Sheets

STEAM TABLE PAN

FIELD OF THE INVENTION

This invention relates to the field of food receptacles and, in particular, to steam table pans.

BACKGROUND OF THE INVENTION

Steam tables, salad bars, and similar arrangements are often used in commercial establishments to serve multiple portions of food one portion at a time. Steam tables in particular generally include a large planar surface with holes to receive the serving pans. Hot water below the pans is generally used to keep the food in the pans hot. A flange or horizontal lip extending from the pan prevents the pan from falling through the hole and often forms a steam seal around the hole.

In addition to performing as serving pans, steam table pans and the like may operate as food storage containers. In this case, the pan may not only hold the food in the heated environment of the steam table, but in a refrigerated environment as well. Additionally, these pans are frequently used to transfer food from point to point, such as from a refrigerator unit to a stove or steam table.

Traditional steam table pans are constructed from relatively thin stainless steel. The lip protruding from the pan is generally a simple flat, planar edge that is substantially flat against the steam table. This arrangement often makes it difficult and cumbersome to remove the pan from the steam table. Additionally, when placing the pan into the steam table hole, it is difficult to gently place the pan in the hole. Usually, the pan must free fall a short distance before resting flush against the steam table, which may cause the food to spill from the pan.

Therefore, what is needed is a steam table pan that can conveniently fit alongside other pans on a steam table and is easily moved. A pan that is easily removed from and placed into holes in the steam table is also needed. A pan that fits alongside other ceramic pans and is aesthetically pleasing is also needed.

SUMMARY OF THE INVENTION

Ceramics, such as porcelain, may be used instead of stainless steel to make the steam table pans. Ceramic pans are easier to place into and remove from holes in the steam table, and can easily handle the transfer from cold to hot environments. Additionally, these pans can be more aesthetically pleasing than stainless steel and are easy to clean. However, the ceramic pans are generally bulky. Due to the size of the overhanging lips, ceramic pans frequently do not fit side by side on a steam table.

The present invention is a ceramic steam table pan. As with traditional stainless steel steam table pans, the ceramic pan includes a lip to prevent the pan from falling through the hole in the steam table. An upper flange is located along one side of the pan, while a lower flange is included along the side opposite the upper flange. The flanges form a portion of the lip and protrude out from the lip.

The upper and lower flanges are dimensioned to interconnect with each other. That is, the lower flange of a first ceramic steam table pan will connect with the upper flange of a second ceramic steam table pan, and the upper flange of a third ceramic steam table pan will rest on the second pan's lower flange. This arrangement allows the ceramic pans to lay side by side and present a flush surface when being used with a standard steam table despite being somewhat bulkier than the substantially flat stainless steel pan lips. In addition, as the flanges are not all flat against the surface of the steam table, removing the pans from the holes in the steam table is easier than removing the flush stainless steel pans.

Therefore, it is an aspect of this invention to provide a steam table pan made of ceramic.

It is another aspect of this invention to provide a steam table pan that is easily cleaned.

It is another aspect of the invention to provide a ceramic steam table pan that fits on a steam table alongside additional ceramic pans.

It is yet another aspect of the invention to provide a ceramic steam table pan including flanges to interconnect with additional steam table pans.

It is still another aspect of the invention to provide a steam table pan that is easily removed from the holes in the steam table.

It is a further aspect of the invention to provide a steam table pan that does not rest flush against the surface of the steam table.

These aspects of the invention are not meant to be exclusive and other features, aspects, and advantages of the present invention will be readily apparent to those of ordinary skill in the art when read in conjunction with the appended claims and accompanying drawings.

DETAILED DESCRIPTION OF THE INVENTION

Figure 1:
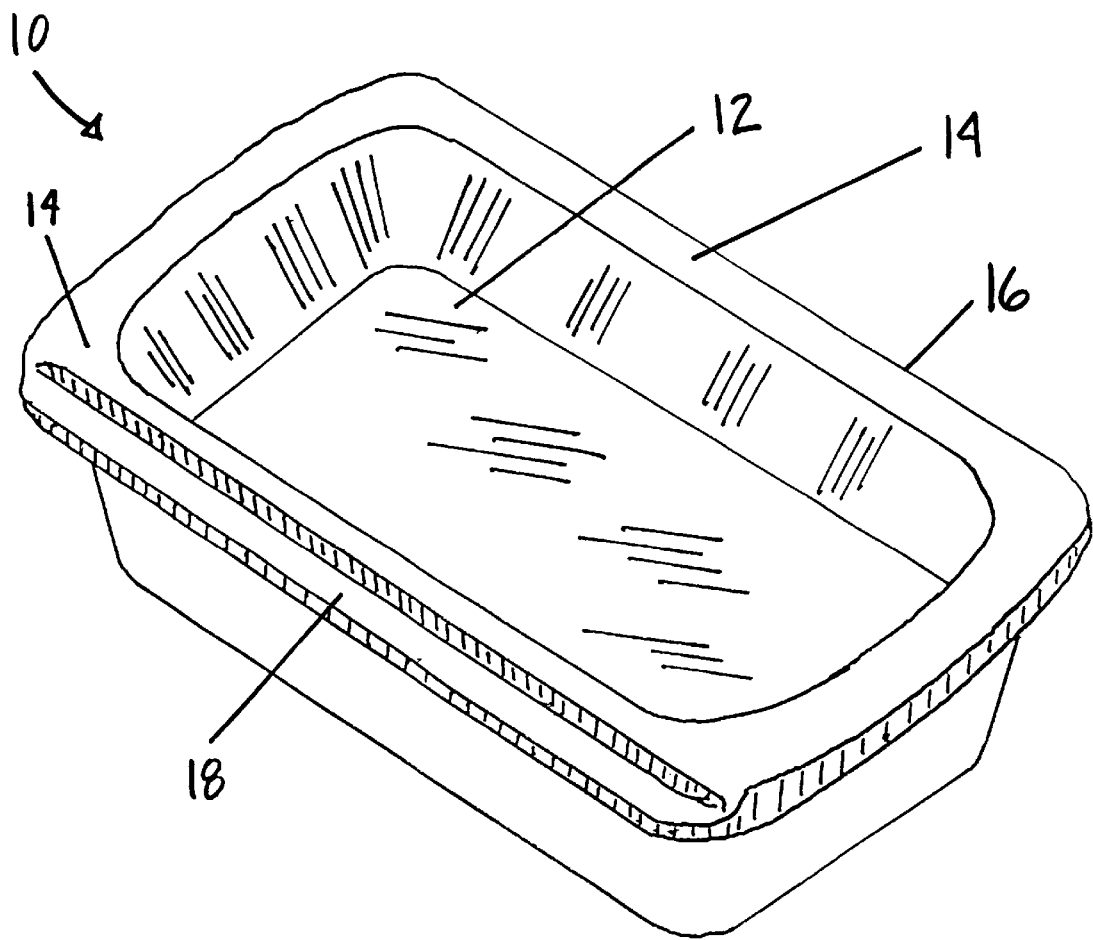
FIG. 1 is a top perspective view of a ceramic steam table pan in accordance with the present invention.
Figure 2:
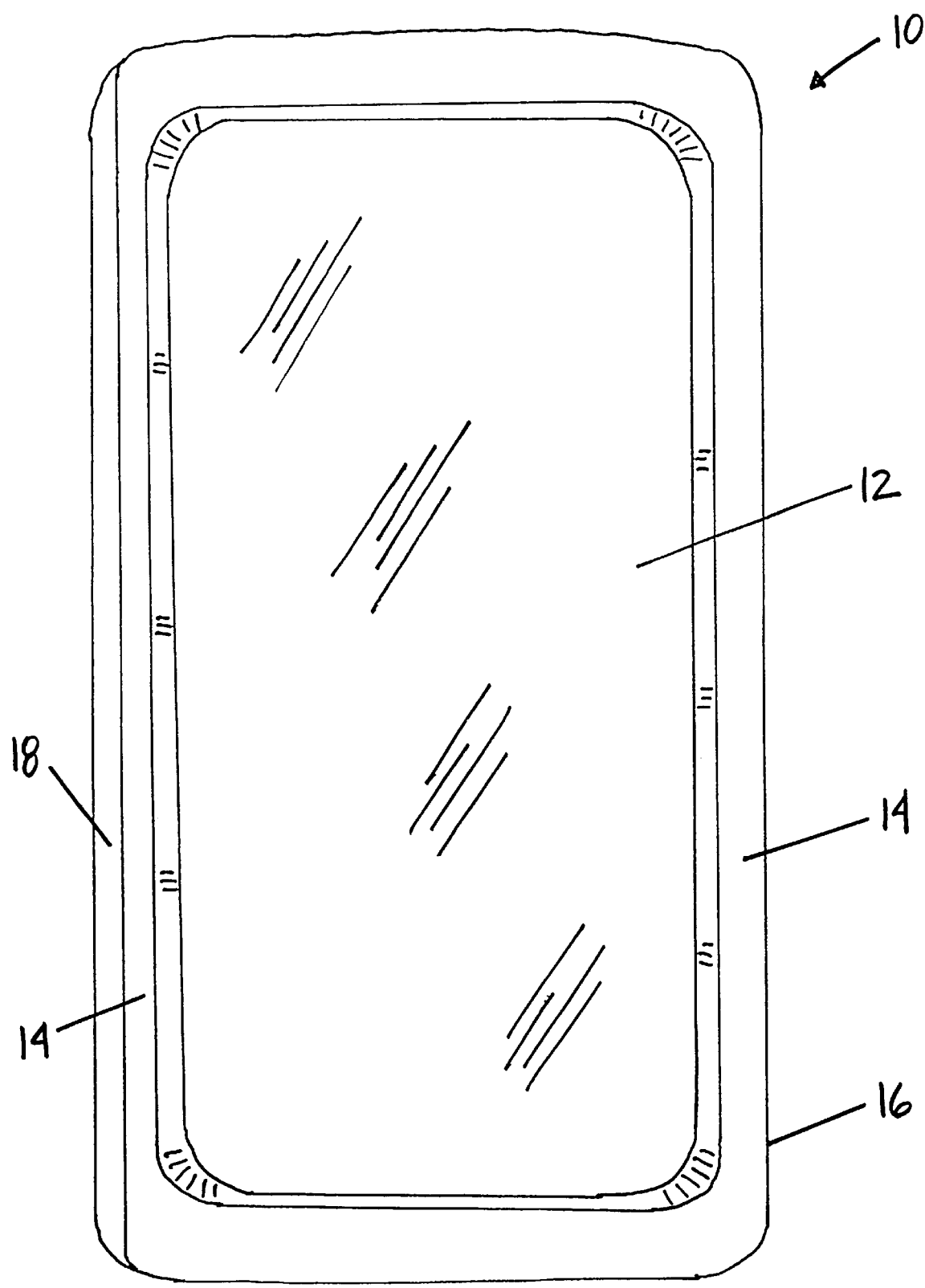
FIG. 2 is a top view of the ceramic steam table pan of FIG. 1.

FIG. 1 and FIG. 2 are top views of the present invention, a ceramic steam table pan. Ceramic steam table pan 10 includes receptacle 12 to receive food (not shown) to be served from the pan. The entire pan is made from a ceramic material, preferably porcelain. Receptacle 12 may be of a variety of dimensions. Preferably, receptacle 12 is dimensioned to fit interchangeably with traditional stainless steel pans on a steam table. Ceramic steam table tray 10 is thus dimensioned to be used on a standard steam table.

Lip 14, made from the same ceramic material as receptacle 12 and forming an integral part of the pan, is disposed about the opening of receptacle 12. Lip 14 serves a similar purpose to the planar edges protruding from prior art stainless steel pans; they allow ceramic steam table pans to be held in standard steam tables. However, lip 14 is not substantially flat. Rather, it has a thickness capable of supporting ceramic steam table pan 10 while providing a simple means of grasping the pan to manually remove it from the steam table.

Figure 3:
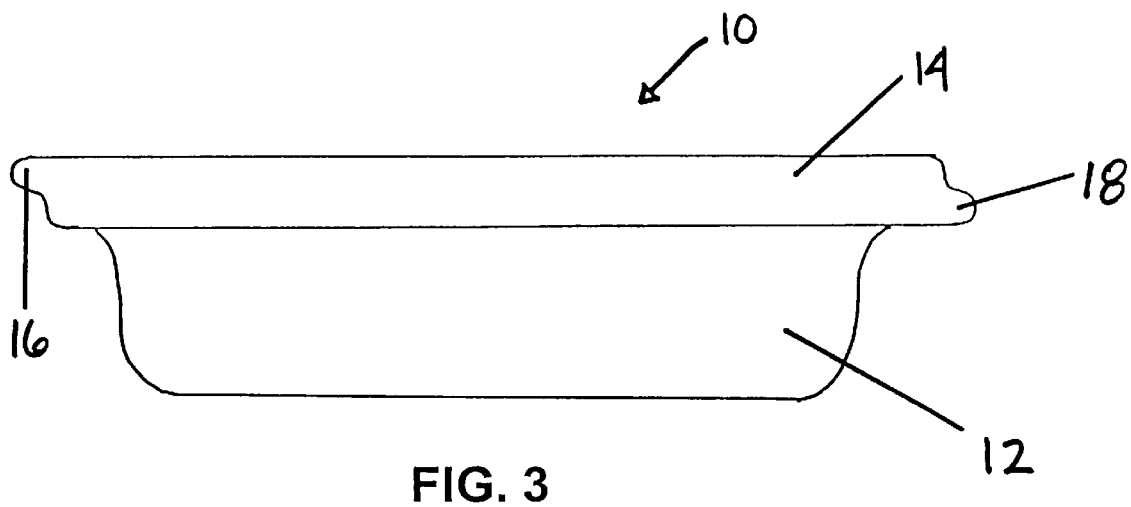
FIG. 3 is a side view of the ceramic steam table pan of FIG. 1 detailing the side flanges of the present invention.

Lip 14 includes upper flange 16 and lower flange 18. The flanges are illustrated in FIG. 3. As can be seen from the figure, upper flange 16 extends from the top surface of lip 14 along one side of receptacle 12. Lower flange 18 extends from the underside of lip 14, running along the side of receptacle 12 opposite upper flange 16. Upper flange 16 and lower flange 18 are integrated into lip 14 and are located on opposite sides from each other with respect to receptacle 12. As can be seen from FIG. 1 and FIG. 2, the flanges run the length of lip 14.

Figure 4:
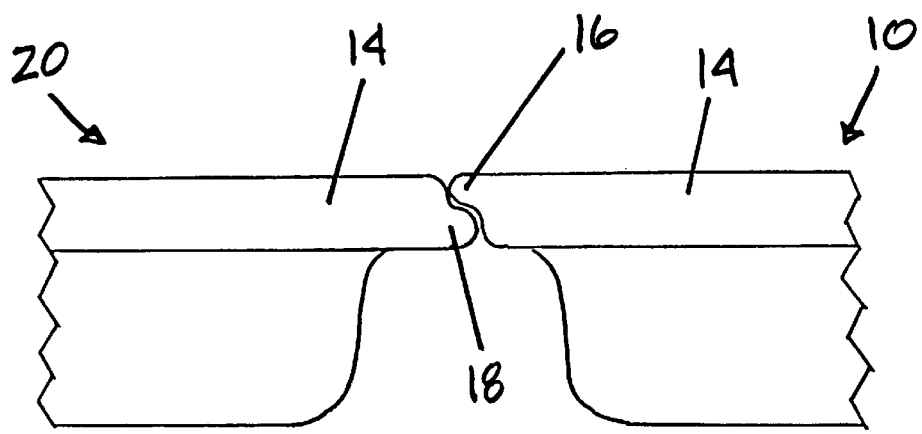
FIG. 4 is a side view of two ceramic steam table pans according to the present invention detailing the interaction of the upper and lower side flanges.

Upper flange 16 and lower flange 18 serve to allow ceramic steam table pan 10 to lay flat when in use on a steam table (not shown). Because lip 14 is thick compared to the planer edges of prior art pans, the lips of the ceramic pans may overlap when several pans are in use on a steam table. Upper flange 16 and lower flange 18 prevent this overlap from tilting ceramic steam table pan 10 into an unusable position. FIG. 4 illustrates the flanges in use. Ceramic steam table pan 10 is located adjacent to second ceramic steam table pan 20, which is substantially identical to pan 10. As can be seen, the respective lips 14 of the pans overlap. However, lower flange 18 of pan 20 accommodates upper flange 16 of pan 10. Gravity urges upper flange 16 against lower flange 18, loosely interconnecting the two flanges and allowing pan 10 to lay flat. The flanges allow a row of adjacent pans to lay flat in a similar manner, as the flanges on each pan (not shown) will interconnect in the manner described above. The multiple pans thus present a flush surface when used with a standard steam table, and none of the pans will tilt when in use.

As detailed above, ceramic steam tale pan 10 is constructed from a ceramic material. The preferable material is porcelain. However, any suitable ceramic material may suffice, so long as lip 14 formed from the material is strong enough to support the pan when filled with food. Additionally, the material must be capable of exactly forming upper flange 16 and lower flange 18. These flanges must be dimensioned properly to receive similar flanges from similar pans in order to allow several pans adjacent to each other to lay flat.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. A steam table pan comprising:
   a receptacle having an opening with first and second sides, said first and second sides being opposite each other;
   an upper flange disposed along said first side of said opening, said upper flange having a top and bottom horizontal extension which are integral with one another and wherein the top horizontal extension is substantially longer than the bottom horizontal extension to provide a male edge; and
   a lower flange disposed along said second side of said opening, said lower flange being opposite said upper flange, said lower flange having a top and bottom horizontal extension which are integral with one another and wherein the bottom horizontal extension is substantially longer than the top horizontal extension to provide a female edge;
   wherein the male edge of said upper flange is dimensioned to slidably interconnect with a corresponding female edge of a lower flange of a substantially identical steam table pan, and wherein the female edge of said lower flange is dimensioned to interconnect with a corresponding male edge of an upper flange of a substantially identical steam table pan, and wherein said receptacle, said upper flange and said lower flange are uniformly constructed of a ceramic material.

2. The steam table pan as claimed in claim 1, further comprising a lip disposed about said opening of said receptacle.

3. The steam table pan as claimed in claim 2, wherein said upper flange and said lower flange comprise an integral part of said lip.

4. The steam table pan as claimed in claim 1, wherein said ceramic material is porcelain.

5. A steam table pan comprising:
   a receptacle having an opening;
   a lip disposed about said opening of said receptacle, said lip having first and second sides, said first and second sides being opposite each other;
   an upper flange having a top and bottom horizontal extension which are integral with one another and wherein the top horizontal extension is substantially longer than the bottom horizontal extension to provide a male edge disposed along said first side of said lip, said upper flange forming an integral part of said lip;
   a lower flange having a top and bottom horizontal extension which are integral with one another and wherein the bottom horizontal extension is substantially longer than the top horizontal extension to provide a female edge disposed along said second side of said lip, said lower flange being opposite said upper flange and forming an integral part of said lip;
   wherein said upper flange is dimensioned to slidably interconnect with a corresponding lower flange of a substantially identical steam table pan, and wherein said lower flange is dimensioned to interconnect with a corresponding upper flange of a substantially identical steam table pan, and wherein said receptacle, said lip, said upper flange and said lower flange are uniformly constructed of a ceramic material.

6. The steam table pan as claimed in claim 5 wherein said ceramic material is porcelain.

7. A plurality of steam table pans for use with a standard steam table, each of said plurality of steam table pans comprising:
   a receptacle having an opening;
   a lip disposed about said opening of said receptacle, said lip having first and second sides, said first and second sides being opposite each other;
   an upper flange having a top and bottom horizontal extension which are integral with one another and wherein the top horizontal extension is substantially longer than the bottom horizontal extension to provide a male edge disposed along said first side of said lip, said upper flange forming an integral part of said lip;
   a lower flange having a top and bottom horizontal extension which are integral with one another and wherein the bottom horizontal extension is substantially longer than the top horizontal extension to provide a female edge disposed along said second side of said lip, said lower flange being opposite said upper flange and forming an integral part of said lip;
   wherein said upper flange is dimensioned to slidably interconnect with a corresponding lower flange of an adjacent, substantially identical steam table pan, and wherein said lower flange is dimensioned to interconnect with a corresponding upper flange of an adjacent, substantially identical steam table pan, and wherein said receptacle, said lip, said upper flange and said lower flange are uniformly constructed of a ceramic material, and wherein said plurality of steam table pans presents a flush surface when used adjacently on a standard steam table.

* * * * *